United States Patent
Hirschsohn et al.

(10) Patent No.: US 11,111,376 B2
(45) Date of Patent: Sep. 7, 2021

(54) FLAME-RETARDED STYRENE-CONTAINING FORMULATIONS

(71) Applicant: Bromine Compounds LTD., Beer Sheva (IL)

(72) Inventors: Yaniv Hirschsohn, Rehovot (IL); Eyal Eden, Shoham (IL)

(*) Notice: Subject to any disclaimer, the term of this patent is extended or adjusted under 35 U.S.C. 154(b) by 0 days.

(21) Appl. No.: 16/497,790

(22) PCT Filed: Mar. 28, 2018

(86) PCT No.: PCT/IL2018/050362
§ 371 (c)(1),
(2) Date: Sep. 25, 2019

(87) PCT Pub. No.: WO2018/178985
PCT Pub. Date: Oct. 4, 2018

(65) Prior Publication Data
US 2020/0024443 A1  Jan. 23, 2020
US 2020/0277488 A2  Sep. 3, 2020

Related U.S. Application Data

(60) Provisional application No. 62/478,614, filed on Mar. 30, 2017.

(51) Int. Cl.
| | |
|---|---|
| *C08L 55/02* | (2006.01) |
| *C08K 5/00* | (2006.01) |
| *C08L 27/18* | (2006.01) |
| *C08K 3/32* | (2006.01) |
| *C08K 5/06* | (2006.01) |
| *C08K 5/136* | (2006.01) |
| *C08K 5/3492* | (2006.01) |
| *C08K 5/521* | (2006.01) |

(52) U.S. Cl.
CPC ............ *C08L 55/02* (2013.01); *C08K 5/0066* (2013.01); *C08L 27/18* (2013.01); *C08K 3/32* (2013.01); *C08K 5/06* (2013.01); *C08K 5/136* (2013.01); *C08K 5/3492* (2013.01); *C08K 5/521* (2013.01); *C08L 2201/02* (2013.01)

(58) Field of Classification Search
CPC ......... C08L 5/02; C08L 55/02; C08K 5/0066; C08K 3/32
See application file for complete search history.

(56) References Cited

U.S. PATENT DOCUMENTS

| | | | |
|---|---|---|---|
| 5,387,636 A | 2/1995 | Landry | |
| 6,503,969 B1 | 1/2003 | Klatt et al. | |
| 2008/0214715 A1 | 9/2008 | Costanzi | |
| 2015/0126650 A1 | 5/2015 | Georlette | |
| 2015/0376368 A1* | 12/2015 | Zucchelli | ............ C08L 23/0815 524/269 |

FOREIGN PATENT DOCUMENTS

| | | |
|---|---|---|
| EP | 2089402 B1 | 8/2015 |
| WO | 2010010561 A1 | 1/2010 |
| WO | 2012113146 A1 | 8/2012 |
| WO | 2013176868 A1 | 11/2013 |
| WO | 2015170130 A1 | 11/2015 |

OTHER PUBLICATIONS

Finberg, et. al., New Flame Retardant Systems for Styrenic Plastics and Methods of Preparation, Polymer Degradation and Stability 64 (1999) pp. 465-470, Elsevier Publishers.
Jian et al., Acrylonitrile-Butadiene-Styrene Terpolymer with Metal Hypophosphites: Flame Retardance and Mechanism Research, Ind. Eng. Chem. Res. 53 (2014) pp. 2299-2307, ACS Publications.

* cited by examiner

*Primary Examiner* — Arrie L Reuther
(74) *Attorney, Agent, or Firm* — Pokalsky Wilczynski Brozek LLP

(57) ABSTRACT

A composition comprising: an impact modified styrene-containing polymer; at least one bromine-containing flame retardant; at least one dialkyl phosphinic acid metal salt $M_1^{n+}(R^1R^2PO_2)_n$ wherein $M_1$ is a metal cation with valence n and $R^1$, $R^2$ are alkyl groups which may be the same or different; at least one anti-dripping agent, wherein the total concentration of the bromine-containing flame retardant and the dialkyl phosphinic acid metal salt is less than 28% by weight based on the sum of all components in the composition, wherein said composition is free of antimony and meets UL-94 V-1/1.6 mm or UL-94 V-0/1.6 mm test requirements.

23 Claims, No Drawings

FLAME-RETARDED STYRENE-CONTAINING FORMULATIONS

Many polymers in commercial use contain flame retardants to reduce their flammability. The flammability characteristics of plastic materials are usually quantifiable according to a method specified by Underwriter Laboratories standard UL 94, where an open flame is applied to the lowermost edge of a vertically mounted test specimen made of the tested polymer formulation. The specimens used in the UL 94 test method vary in thickness (typical thicknesses are ~3.2 mm, ~1.6 mm, ~0.8 mm and ~0.4 mm). During the test, various features of the flammability of the test specimens are recorded. Then, according to the classification requirements, the polymer formulation is assigned with either V-0, V-1 or V-2 rating at the measured thickness of the test specimen. Polymer formulation assigned with the V-0 rating is the less flammable. Furthermore, in the UL-94 burning test, the thinner the specimens are, the longer the burning time.

The additives of choice for impact modified styrenics polymers, such as high impact polystyrene (HIPS) and acrylonitrile-butadiene-styrene (ABS), are bromine-containing compounds, owing to their ability to achieve at a reasonable concentration an acceptable level of flame retardancy and retain the mechanical properties of the polymer. But to reach the goal, bromine-containing compounds need antimony as synergist. That is, bromine-containing flame retardants are added to plastic polymers together with antimony trioxide ($Sb_2O_3$), which functions synergistically to enhance the activity of the flame retardant, usually at about 2:1-5:1 weight ratio (calculated as the ratio between the concentrations of bromine and $Sb_2O_3$ in the polymer composition). For example, in U.S. Pat. No. 5,387,636 it is stated that antimony trioxide is used in HIPS at a concentration ranging from 2 to 6 wt %. Finberg et al. [Polymer Degradation and Stability 64, p. 465-470 (1999)] reported flame retarded ABS meeting UL-94 V-0/1.6 mm, where bromine and antimony trioxide concentrations were from about 11 to 15% and 6 to 8% by weight, respectively, indicating a fairly high loading level of antimony trioxide.

The dependence of some commercial flame retardants on antimony trioxide in HIPS and ABS was investigated in co-assigned WO 2010/010561. Antimony trioxide was applied in a small amount, that is, $[Sb_2O_3] \leq 2.0$ wt %, and the concentration of the flame retardant was adjusted to provide an amount of bromine from 10 to 18 wt %. The amount of bromine in the polymer composition is calculated by multiplying the bromine content of the flame retardant under consideration by the weight concentration of that flame retardant in the polymer composition. The amount of bromine supplied by a given flame retardant is hereinafter designated $Br_{Fr\ name}$. A sharp increase in the amount of bromine needed to meet UL 94 V-1 or V-0 ratings was generally observed when the concentration of antimony trioxide was reduced to less than 2 wt % (from 2 wt %→1.5 wt %→1.0 wt %→0.5 wt %). Among the bromine-containing additives tested in WO 2010/010561, Tris(2,4,6-tribromophenoxy)-s-triazine (also known as FR-245) showed a fairly modest dependence on antimony trioxide compared to other flame retardants. But even FR-245 (added to supply $Br_{FR-245}$=12 wt %) needed the help of 1.5 wt % antimony trioxide in order to achieve UL 94 V-0 rating for ABS (ABS is more difficult to flame retard than HIPS; see Example of WO 2010/010561). Furthermore, as shown by Example 2 below, to compensate for complete removal of antimony trioxide from ABS, FR-245 must be applied in an amount as high as ~33.0% wt (equivalent to $Br_{FR-245}$=22%). Another study reported in WO 2013/176868 also shows that ABS meeting UL-94 V-0/1.6 mm rating with $10\% \leq Br_{FR-245} \leq 15\%$ is achievable only upon antimony addition.

To summarize, many commercial ABS formulations available in the market are flame retarded with the aid of 10 to 15 wt % bromine incorporated in the formulation. The conventional wisdom in the art is that antimony must be present in these formulations to enable them to achieve UL-94 V-1/1.6 mm or UL-94 V-0/1.6 mm ratings at acceptable total loading levels of additives.

Metal salts of hypophosphorous acid, that is, metal hypophosphite salts [e.g., aluminum hypophosphite, $Al(H_2PO_2)_3$ and calcium hypophosphite, $Ca(H_2PO_2)_2$] were applied to reduce the flammability of ABS, as reported in Ind. Eng. Chem. Res., 2014, 53 (6), pp 2299-2307 and WO 2015/170130 in the name of Italmatch Chemical SpA. In the latter publication it was shown that as a sole flame retardant additive in ABS, $Al(H_2PO_2)_3$ is effective at a very high concentration of 35% to achieve UL 94 V-0/3.2 mm rating. But even this unacceptably high loading level is insufficient to meet UL 94 rating requirements for thinner test specimens (1.6 mm thick specimen). As to calcium hypophosphite, it is mentioned in U.S. Pat. No. 6,503,969 (in the name of BASF) and WO 2012/113146 (in the name of Rhodia).

We have now found that antimony-free, about 10 to 15 wt % bromine-containing ABS and HIPS compositions can be flame retarded very effectively upon addition of metal hypophosphite salts. The experimental results reported below indicate that complete removal of antimony from ABS is compensated by the presence of a fairly small amount of a metal hypophosphite salt, to achieve UL-94 V-1/1.6 mm or UL-94 V-0/1.6 mm ratings. The metal hypophosphite is applied in an amount significantly lower than one would expect to be effective on the basis of the poor efficacy of these additives in ABS. For example, illustrative ABS compositions with bromine content of 12 wt % were able to meet the UL-94 V-0/1.6 mm test requirements with the aid of only 6 wt % of metal hypophosphite, suggesting that the effect of the two components working together is greater than the effect of each of the components separately, with the metal hypophosphite enhancing the performance of the major (bromine-containing) flame retardant.

The metal hypophosphite salt is preferably selected from the group consisting of aluminum hypophosphite and calcium hypophosphite. $Al(H_2PO_2)_3$ is available on the market from various manufacturers; it can be made by reacting an aluminum salt with hypophosphorous acid (e.g., with slow heating at 80-90° C. (see Handbook of inorganic compounds, second addition by D. L. Perry; see also U.S. Pat. No. 7,700,680 and J. Chem. Soc. P. 2945 (1952)). $Ca(H_2PO_2)_3$ is also commercially available. The salt can be prepared by the reaction of calcium hydroxide on yellow phosphorous, as shown in WO 2015/170130, or by the reaction of calcium carbonate or oxide with $H_3PO_2$, followed by evaporation of the solvent and recovery of the salt (see Encyclopedia of the Alkaline Earth Compounds by R. C. Ropp; 2013 Elsevier). Other methods are described in U.S. Pat. No. 2,938,770, based on the treatment of sodium hydroxide with an ion exchange resin. Production of calcium hypophosphite is also described in CN 101332982.

Experimental work conducted in support of this invention shows that metal hypophosphite salts are able to assist different types of bromine-containing flame retardants in antimony-free ABS formulations. However, metal hypophosphite works especially well together with bromine-containing flame retardant that is melt-blendable in ABS (i.e., melts at the processing temperature of ABS). The bromine-containing flame retardant has bromine atoms which are either all aromatically-bound or all aliphatically-bound, with bromine content of the flame retardant being in the range from 50 to 70% by weight. "Mixed" flame retardants having both aromatically and aliphatically-bound bromine and flame retardants with an exceptionally high bromine content (~80%) are also workable, though they seem to cooperate less effectively with metal hypophosphite. For example, the following brominated flame retardants work well together with metal hypophosphite in antimony-free ABS:

(i) Tris(2,4,6-tribromophenoxy)-s-triazine, with aromatically-bound bromine atoms, having bromine content of 67% by weight, represented by the following formula:

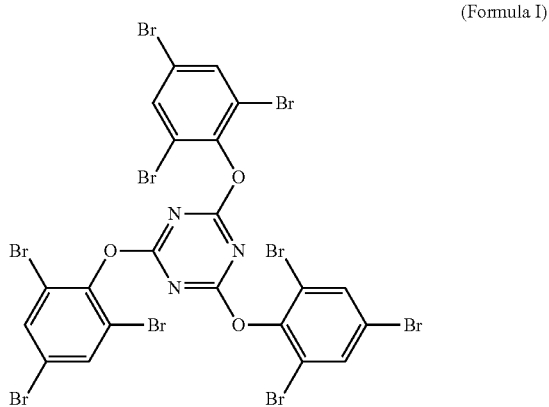 [SMILES: Brc1cc(Br)c(Oc2nc(Oc3c(Br)cc(Br)cc3Br)nc(Oc3c(Br)cc(Br)cc3Br)n2)c(Br)c1]

(Formula I)

The preparation of tris(2,4,6-tribromophenoxy)-s-triazine is generally based on the reaction of cyanuric chloride with 2,4,6-tribromophenolate under various conditions well known in the art (see, for example, U.S. Pat. Nos. 5,907,040, 5,965,731 and 6,075,142). The flame retardant is also commercially available from ICL-IP under the name FR-245. The chemical name and FR-245 are interchangeably used herein.

(ii) Tris(tribromoneopentyl) phosphate, with aliphatically-bound bromine atoms, having bromine content of 70% by weight, represented by the following chemical structure:

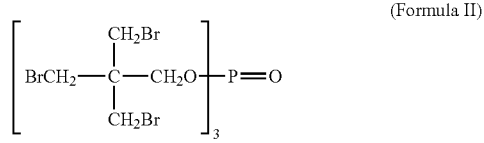

(Formula II)

The preparation of Tris(tribromoneopentyl) phosphate is generally based on the reaction of three moles of tribromoneopentyl alcohol with 1 mol of a phosphorus oxyhalide under conditions well known in the art (see, for example, U.S. Pat. No. 5,710,309 and the references cited therein). The compound is also commercially available from ICL-IP (FR-370). The chemical name and FR-370 are interchangeably used herein.

iii) Tetrabromobisphenol A, with aromatically-bound bromine atoms, having bromine content of 58.5% by weight, represented by the following formula:

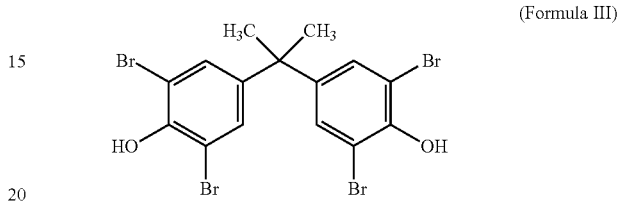

(Formula III)

The preparation of tetrabromobisphenol A is generally based on the bromination of bisphenol A which takes place in an aqueous lower alcohol as a solvent or in water-immiscible organic solvents. The compound is also commercially available from ICL-IP (FR-1524). The chemical name and FR-1524 are interchangeably used herein.

iv) brominated epoxy resins and end-capped derivatives thereof, with aromatically-bound bromine atoms, having bromine content of 50 to 60% by weight, represented by the Formula (IV):

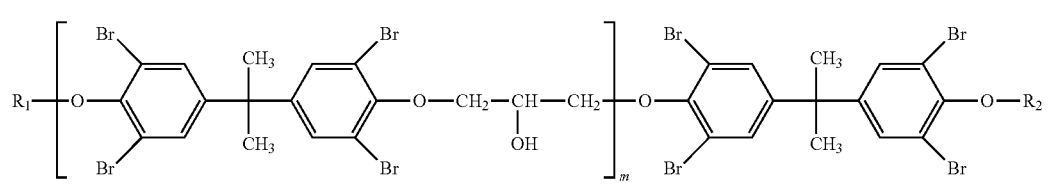

(Formula IV)

wherein m indicates degree of polymerization, $R_1$ and $R_2$ are independently selected from the group consisting of:

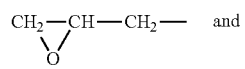 and

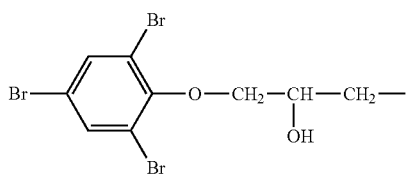

Preferred are tribromophenol end-capped low-molecular weight resins represented by the following Formula (IVa) and mixtures thereof:

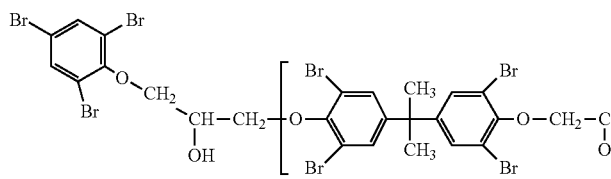 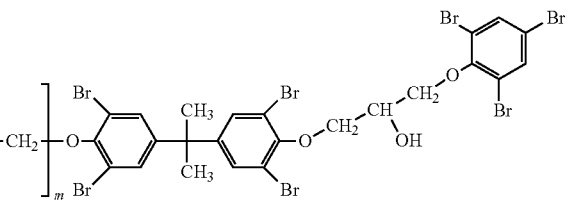

wherein m is an integer in the range between 0 and 5, and more preferably in the range between 0 and 4. That is, bis(2,4,6-tribromophenyl ether)-terminated tetrabromobisphenol A-epichlorohydrin resin, which is in the form of a mixture comprising the individual tribromophenol end-capped compounds of Formula IVa wherein m equals 0, 1 and 2, and possibly higher order oligomers of bis(2,4,6-tribromophenyl ether)-terminated tetrabromobisphenol A-epichlorohydrin resin. Flame retardants of Formula IVa with number-average molecular weight from 1300 to 2500, more preferably from about 1400 to 2500, for example, from 1800 to 2100, are commercially available (e.g., F-3020, manufactured by ICL-IP), with molecular weight of about 2000, bromine content of 56%.

The invention is directed to a substantially antimony-free composition meeting UL-94 V-1/1.6 mm or UL-94 V-0/1.6 mm test requirements, comprising:
an impact modified styrene-containing polymer, preferably ABS; at least one bromine-containing flame retardant, preferably Tris(2,4,6-tribromophenoxy)-s-triazine;
at least one metal hypophosphite salt $Mq^+(H_2PO_2)_q$, wherein M indicates a metal cation with valence q, and
at least one anti-dripping agent,
wherein the total concentration of the bromine-containing flame retardant and the metal hypophosphite is less than 28% by weight, e.g., from 18 to 26% by weight, more specifically from 19 to 25% by weight (e.g., 20 to 25%), especially from 20 to 24% by weight (based on the sum of all components in the composition; hereinafter, unless otherwise indicated, concentrations are based on the total weight of the composition).

The composition of the invention is substantially antimony-free. By "substantially antimony free" is meant that the concentration of antimony (e.g., antimony trioxide) in the composition is well below the acceptable amount used in plastics in conjunction with halogenated additives in styrenic formulations, e.g., not more 0.3% by weight, more preferably, up to 0.2% by weight, e.g., 0.0-0.1% by weight (based on the total weight of the composition). Most preferably, the compositions of the invention are totally devoid of antimony.

Specific impact modified styrenic polymers (including copolymers/terpolymers) are ABS, HIPS and ASA. ABS refers to copolymers and terpolymers that include the structural units corresponding to (optionally substituted) styrene, acrylonitrile and butadiene, regardless of the composition and method of production of said polymers. Characteristics and compositions of ABS are described, for example, in Encyclopedia of Polymer Science and Engineering, Volume 16, pages 72-74 (1985). ABS compositions of the invention contain not less than 50% by weight ABS, e.g., not less than 60% by weight, more specifically between 65 and 80 by weight ABS, with MFI between 1 and 50 g/10 min (measured according to ISO 1133 at 220° C./10 kg). HIPS indicates the rubber-modified copolymers of styrenic monomers, obtainable, for example, by mixing an elastomer (butadiene) with the (optionally substituted) styrenic monomer(s) prior to polymerization. Characteristics and compositions of HIPS are described, for example, in "Encyclopedia of Polymer Science and Engineering", Volume 16, pages 88-96 (1985). The HIPS compositions provided by the invention generally comprise not less than 50% by weight HIPS, e.g., not less than 60% by weight, more specifically between 65 and 80 by weight HIPS having a MFI between 1 and 50 (ISO 1133; 200° C./5 kg). ASA is acrylonitrile styrene acrylate and is sometimes used as a replacement for ABS (incorporating acrylate rubber instead of butadiene rubber).

The total concentration of the bromine-containing flame retardant and the metal hypophosphite in the ABS composition is preferably from 15 to 28% by weight, more specifically from 20 to 25% by weight, for example from 20 to 24% by weight based on the total weight of the composition, such that the concentration of bromine in the composition of the invention is from 9.5 to 15.5% by weight, e.g., 10-15%. As explained above, the concentration of bromine in the composition is calculated by multiplying the bromine content of a given flame retardant (designated herein Br Fr name and expressed as % by weight) by the weight concentration of that flame retardant in the composition. For example, the bromine contents of commercially available FR-245, FR-370, FR-1524 and F-3020 are $Br_{FR-245}$=67%, $Br_{FR-370}$=70%, $Br_{FR-1524}$=58.5% and $Br_{F-3020}$=56%, respectively. Therefore, to incorporate for example 12% by weight bromine into the ABS composition, the corresponding concentrations of these four flame retardants should be 17.9%, 17.1%, 20.5 and 21.4% (by weight relative to the total weight of the composition). As shown below, metal hypophosphite can be added at a concentration from 2 to 9%, preferably from 3 to 9%, for example from 4 to 8%, more specifically from 5 to 7% by weight relative to the total weight of the ABS (or HIPS) composition.

The binary mixture consisting of a bromine-containing flame retardant and metal hypophosphite has been shown to reduce effectively the flammability of ABS and HIPS; in some preferred compositions of the invention, having bromine concentration in the range from 11 to 15% by weight, the mixture is proportioned such that the bromine/Al $(H_2PO_2)_3$ or bromine/Ca$(H_2PO_2)_2$ weight ratio is from 2.5:1 to 1.5:1, preferably from 2.25:1 to 1.75:1, more preferably from 2.1:1 to 1.9:1, e.g., around 2:1.

The compositions according to the present invention also include one or more anti-dripping agents such as polytetrafluoroethylene (abbreviated PTFE) in a preferred amount between 0.05 and 1.0 wt %, more preferably between 0.1 and 0.5 wt % and even more preferably from 0.1 to 0.3 wt %, based on the total weight of the composition. PTFE is described, for example, in U.S. Pat. No. 6,503,988. Fibril-forming PTFE grades showing high melt-dripping preventing ability are preferred (e.g., Teflon® 6C (registered trademark of Dupont) and Hostaflon® 2071 (registered trademark of Dyneon).

For example, the following compositions were found to possess the desired flammability properties, that is, fulfilling the requirements for UL 94 V-1/1.6 mm or UL 94 V-0/1.6 mm rating: from 60 to 80% by weight of ABS (e.g., 72 to 77%), from 15 to 20% by weight of FR-245 (e.g., 16 to 19%), from 3 to 9% by weight of Al $(H_2PO_2)_3$, $Ca(H_2PO_2)_2$ or a mixture thereof (e.g., from 4 to 8%) and from 0.1 to 0.5% by weight of PTFE (e.g., from 0.15 to 0.35%);

from 60 to 80% by weight of ABS (e.g., 70 to 75%), from 15 to 20% by weight of FR-370 (e.g., 16 to 19%), from 3 to 9% by weight of Al $(H_2PO_2)_3$, $Ca(H_2PO_2)_2$ or a mixture thereof (e.g., from 4 to 8%) and from 0.1 to 0.5% by weight of PTFE (e.g., from 0.15 to 0.35%);

from 60 to 80% by weight of ABS (e.g., 70 to 75%), from 18 to 23% by weight of FR-1524 (e.g., 19 to 22%), from 3 to 9% by weight of Al $(H_2PO_2)_3$, $Ca(H_2PO_2)_2$ or a mixture thereof (e.g., from 4 to 8%) and from 0.1 to 0.5% by weight of PTFE (e.g., from 0.15 to 0.35%); and from 60 to 80% by weight of ABS (e.g., 73 to 78%), from 18 to % by weight of tribromophenol end-capped low-molecular weight epoxy resin of Formula IVa (e.g., 19 to 22%), from 3 to 9% by weight of Al $(H_2PO_2)_3$, $Ca(H_2PO_2)_2$ or a mixture thereof (e.g., from 4 to 8%) and from 0.1 to 0.5% by weight of PTFE (e.g., from 0.15 to 0.35%).

Apart from the styrenic polymer (for example, ABS, HIPS or ASA), the bromine-containing flame retardant, the metal hypophosphite and the anti-dripping agent, the composition of this invention may further contain conventional additives, such as UV stabilizers (e.g., benzotriazole derivative), processing aids, antioxidants (e.g., hindered phenol type), lubricants, pigments, heat stabilizers, dies and the like. The total concentration of these conventional additives is typically not more than 3% by weight. In particular, the compositions of the invention may contain antioxidant(s) and heat stabilizer(s), e.g., a blend of organo-phosphite and hindered phenolic antioxidants.

We have also found that the flammability and/or mechanical properties of substantially $Sb_2O_3$-free, bromine-containing and metal hypophosphite-incorporated ABS compositions of the invention can be modified upon addition of auxiliary additives selected from the group consisting of halogen-free flame retardants (e.g., phosphorous-based), charring agents and some mineral fillers, such as talc. In general, the compositions of the invention are devoid of dialkyl phosphinic acid salts.

For example, an aryl phosphate ester of hydroquinone (1,4-dihydroxybenzene) of Formula (V):

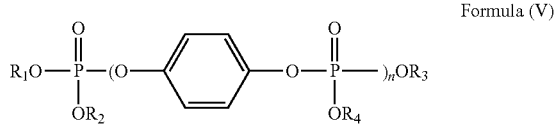

Formula (V)

wherein $R^4$, $R^2$, $R^3$ and $R^4$ each independently is aryl (e.g., phenyl) or alkyl-substituted aryl (e.g., xylenyl), optionally interrupted with heteroatoms, and n has an average value of from about 1.0 to about 2.0, may be used. The compounds of Formula (V) are described in EP 2089402. In general, the hydroquinone bis-phosphates of Formula V are prepared by reacting a diaryl halophosphate with hydroquinone in the presence of a catalyst. For example, diphenylchlorophosphate (DPCP) is reacted with hydroquinone in the presence of $MgCl_2$ to produce hydroquinone bis-(diphenyl phosphate). Detailed methods for synthesizing compounds of Formula (V) can be found in EP 2089402. The preferred compound of Formula V to be used in this invention $[R_1=R_2=R_3=R_4=\text{phenyl}, 1.0<n\leq1.1$, that is, hydroquinone bis(diphenyl phosphate) with an n average value of about $1.0<n\leq1.05]$ is the product of Example 1 of EP 2089402, hereinafter named "HDP" for the purpose of simplicity. This compound is obtainable in a solid form, and may be employed in the form of pastilles.

With the aid of aryl phosphate esters and/or one or more charring agents and/or one or more fillers (for example, selected from the group consisting of a) polydimethylsiloxane, e.g., high molecular weight siloxanes methacrylic functionality or ultra-high molecular weight polydimethylsiloxane and b) novolac epoxy resins, including ECN resins available from Ciba), it is possible to obtain good flammability performance in antimony-free, bromine-containing ABS even at lower loading levels of the metal hypophosphite, that is, working at a $Br/Al(H_2PO_2)_3$ or $Br/Ca(H_2PO_2)_2]$ weight ratio that is preferably greater than 2:1, for example, 3:1 to 9:1, e.g., 3:1 to 7:1 or 3:1 to 5:1.

Accordingly, another aspect of the invention relates to a substantially $Sb_2O_3$-free ABS (or HIPS) composition meeting UL-94 V-1/1.6 mm or UL-94 V-0/1.6 mm test requirements, comprising at least one bromine-containing flame retardant and at least one metal hypophosphite, wherein the composition further comprises at least one of the group consisting of aryl phosphate ester, polydimethylsiloxane and novolac epoxy resins. Preferably, the composition is characterized in that the bromine concentration of the composition is from 10 to 15% and the Br/metal hypophosphite weight ratio is greater than 2:1, e.g., from 2:1 to 7:1, preferably from 3:1 to 5:1. For example, the following compositions were found to possess the desired flammability properties, that is, fulfilling the requirements for UL 94 V-1/1.6 mm or UL 94 V-0/1.6 mm rating:

from 60 to 80% by weight of ABS (e.g., 70 to 75%), from 15 to 20% by weight of FR-245 (e.g., 16 to 19%), from 3 to 6% by weight of Al $(H_2PO_2)_3$, $Ca(H_2PO_2)_2$ or a mixture thereof (e.g., from 3 to 5%), from 1 to 10% by weight of a combination consisting of aryl phosphate ester of hydroquinone and a charring agent (e.g., from 2 to 8%) and from 0.1 to 0.5% by weight of PTFE (e.g., from 0.15 to 0.35%).

Mineral fillers are known to modify properties of thermoplastics such as moldability and stability, and some fillers also display flame-retardant characteristics to some extent. We have now found that talc (supplied in a masterbatch form, for example, as 60% concentrate in linear low density polyethylene carrier) has a positive effect on the flammability behavior of antimony-free, bromine-containing and metal hypophosphite-incorporated ABS. It has been shown that several benefits can be gained by the addition of talc to such ABS compositions, e.g., in a small concentration from 0.5 to 3, preferably from 0.5 to 1.5. Talc addition permits either reduction of bromine concentration (e.g., from 12 to 10% by weight) or metal hypophosphite concentration (e.g., from 6 to 4.5% by weight), achieving excellent flammability properties combined with greatly improved mechanical properties, especially in the presence of calcium hypophosphite. For example, the following compositions were found to possess the desired flammability properties, that is, fulfilling the requirements for UL 94 V-1/1.6 mm or UL 94 V-0/1.6 mm rating:

from 60 to 80% by weight of ABS (e.g., 70 to 80%), from 13 to 18% by weight of FR-245 (e.g., 14 to 16%), from 4 to 8% by weight of Al $(H_2PO_2)_3$, $Ca(H_2PO_2)_2$ or a mixture thereof (e.g., from 5 to 7%), from 0.5 to 3 talc (e.g., from 1 to 2%) and from 0.1 to 0.5% by weight of PTFE (e.g., from 0.15 to 0.35%);

from 60 to 80% by weight of ABS (e.g., 73 to 78%), from 15 to 20% by weight of FR-245 (e.g., 16 to 19%), from 3 to 9% by weight of Al $(H_2PO_2)_3$, $Ca(H_2PO_2)_2$ or a mixture thereof (e.g., from 3 to 5%) from 0.5 to 3 talc (e.g., from 1 to 2%) and from 0.1 to 0.5% by weight of PTFE (e.g., from 0.15 to 0.35%).

One of the additives mentioned above is polydimethylsiloxane. The combination of $Al(H_2PO_2)_3$ or $Ca(H_2PO_2)_2$, especially Ca $(H_2PO_2)_2$, with polydimethylsiloxane (PDMS) available in a solid form (e.g., powders) has been shown to be beneficial in ABS compositions that contain from 9.5 to 15.5, e.g., from 10 to 15% bromine (e.g., $9.5\% \leq Br_{Fr\ 245} \leq 15.5\%$). Polydimethylsiloxane include ultra-high molecular weight (UHMW) available in the market in a solid form, e.g., powdered additives (e.g., mixed with silica) or dispersed in pelletized concentrates. Experimental results reported below indicate that a mixture consisting of $Ca(H_2PO_2)_2$ and the aforementioned types of polydimethylsiloxane can be compounded with ABS (or HIPS) and the bromine-containing compound at reduced bromine levels as set out above. For example, a composition comprising ABS, 10 to 15% by weight bromine supplied by a bromine-containing compound such as FR-245, $Ca(H_2PO_2)_2$ and polydimethylsiloxane wherein the weight ratio bromine:Ca $(H_2PO_2)_2$ is greater than 2:1, e.g., from 3:1 to 7:1, and the weight ratio $Ca(H_2PO_2)_2$:PDMS is from 7:1 to 1:2 meet the UL 94 V-1/1.6 mm or UL 94 V-0/1.6 mm rating. The total concentration of the $\{Ca(H_2PO_2)_2+PDMS\}$ mixture is preferably not less than 4% based on the total weight of the composition, e.g., from 4 to 7% by weight. The $\{Ca(H_2PO_2)_2+PDMS\}$ can be proportioned to give a set of benefits (reduced flammability and mechanical strength measured by the izod notched impact test). Preferably, the mixture of $Ca(H_2PO_2)_2$+PDMS is roughly equally proportioned, e.g., the weight ratio $Ca(H_2PO_2)_2$:PDMS is from 3:2 to 2:3.

More specifically, the invention provides the following ABS composition:

from 60 to 80% ABS (e.g., from 70 to 80), from 15 to 22.5% by weight of FR-245 (e.g., from 15 to 21%), from 2.0 to 7.0% by weight of Al $(H_2PO_2)_3$, $Ca(H_2PO_2)_2$ or a mixture thereof (e.g., from 2.0 to 5.0%), from 0.5 to 4.0 polydimethylsiloxane (e.g., from 1.0 to 3.0%) and from 0.1 to 0.5% by weight of PTFE (e.g., from 0.15 to 0.35%).

The preparation of the compositions of the invention may be carried out using different methods known in the art. For example, the compositions are produced by melt-mixing the components, e.g., in a co-kneader or twin screw extruder, wherein the mixing temperature is in the range from 160 to 240° C. It is possible to feed all the ingredients to the extrusion throat together, but it generally preferred to first dry-mix some of the components, and then to introduce the dry blend into the main feed port of the extruder, with one or more of the ingredients being optionally added downstream. Process parameters such as barrel temperature, melt temperature and screw speed are described in more detail in the examples that follow.

The resultant extrudates are comminuted into pellets. The dried pellets are suitable for feed to an article shaping process, injection molding, extrusion molding, compression molding, optionally followed by another shaping method. Articles molded from the compositions form another aspect of the invention.

EXAMPLES

Materials used for preparing the formulations are tabulated in Table 1 (FR is the abbreviation of flame retardant):

TABLE 1

| Component (manufacturer) | GENERAL DESCRIPTION | FUNCTION |
|---|---|---|
| ABS Magnum 3404 (Styron) | acrylonitrile-butadiene-styrene | Plastic matrix |
| HIPS Styron 1200 | high impact polystyrene | Plastic matrix |
| FR-245 (ICL-IP) | Tris(2,4,6-tribromophenoxy)-s-triazine bromine content: 67 wt % | Brominated FR |
| F-3020 (ICL-IP) | End-capped brominated epoxy resin MW = 2000, Bromine content: 56 wt % | Brominated FR |
| FR-1524 (ICL-IP) | Tetrabromobisphenol-A Bromine content: 58.5 wt % | Brominated FR |
| FR-370 (ICL-IP) | Tris(tribromoneopentyl)phosphate Bromine content: 70% | Brominated FR |
| $Ca(H_2PO_2)_2$ (Sigma Aldrich or from Special Materials) | Calcium hypophosphite | Flame retardancy enhancer |
| $Al(H_2PO_2)_3$ (Hubei Sky Lake Chemical) | Aluminum hypophosphite | Flame retardancy enhancer |
| HDP (Example 1 of EP 2089402; from ICL-IP) | phenyl phosphate ester of hydroquinone | P-FR |
| Melapur 200 (BASF) | Melamine polyphosphate | P-FR |
| ECN 1299 (Huntsman) | Epoxy cresol novolac | Charring agent |
| DC 4-7081 (Dow Corning) | PDMS | Charring agent, impact modifier |
| LSYI-300C (ChengDu Silike Technology) | Ultra high molecular weight PDMS (60% siloxane on 40% silica) | Charring agent, impact modifier |
| talc MB 60% (Kafrit) | Talc in a masterbatch form 60% w/w talc in LLDPE | filler |
| Hostaflon 2711 (Dyneon) | PTFE (Teflon) | Anti-dripping agent |
| Irganox ® B-225 (Ciba) | Phenol:phosphite 3:1 based stabilizer | Antioxidant & heat stabilizer |

Preparation

Polymer and all additives were premixed and the blend was fed via Feeder no. 1 into the main port of a twin-screw co-rotating extruder ZE25 with L/D=32 (Berstorff). Operating parameters of the extruder were as follows:

Barrel temperature (from feed end to discharge end): 160° C., 180° C., 200° C., 200° C., 210° C., 220° C., 230° C., die—240° C. Screw rotation speed: 350 rpm; Feeding rate: 12 kg/hour.

The strands produced were pelletized in a pelletizer 750/3 from Accrapak Systems Ltd. The resultant pellets were dried in a circulating air oven (Heraeus Instruments) at 80° C. for 3 hours. The dried pellets were injection molded into test specimens using Allrounder 500-150 from Arburg under the conditions tabulated below:

TABLE 2

| PARAMETER | Set values |
|---|---|
| $T_1$ (Feeding zone) | 210° C. |
| $T_2$ | 215° C. |
| $T_3$ | 220° C. |
| $T_4$ | 225° C. |
| $T_5$ (nozzle) | 230° C. |
| Mold temperature | 35° C. |
| Injection pressure | 1300 bar |
| Holding pressure | 700 bar |
| Back pressure | 50 bar |
| Holding time | 11 s |

TABLE 2-continued

| PARAMETER | Set values |
| --- | --- |
| Cooling time | 9 s |
| Mold closing force | 500 kN |
| Filling volume (portion) | 30 ccm |
| Injection speed | 35 ccm/sec |

Specimens of 1.6 mm thicknesses were prepared. The test specimens were conditioned for one week at 23° C., and then subjected to the several tests to determine their properties.

Flammability Test

A direct flame test was carried out according to the Underwriters-Laboratories standard UL 94 in a gas methane operated flammability hood, applying the vertical burn on specimens of 1.6 mm thickness.

Mechanical Test

The Notched Izod impact test was carried out according to ASTM D256-81 using Instron Ceast 9050 pendulum impact system. Tensile properties were determined according to ASTM D638 using Zwick 1435 material testing machine (type 2 dumbbells were used, with a speed test of 5 mm/min).

Examples 1-6 (all Comparative)

ABS Flame Retarded with Bromine-Containing Compounds or Metal Hypophosphite Alone In this set of examples, bromine-containing flame retardants were applied to reduce the flammability of ABS without the aid of antimony trioxide. Likewise, metal hypophosphite salts were tested as sole flame retardants in ABS. The compositions and the results of the flammability test are tabulated in Table 3.

TABLE 3

| Example | Ex. 1 | Ex. 2 | Ex. 3 (Ex. 7 from WO 2013/176868) | Ex. 4 | Ex.5 (Ex. C5 from WO 2015/170130) | Ex. 6 |
| --- | --- | --- | --- | --- | --- | --- |
| composition | | | | | | |
| ABS (wt %) | 75.7 | 66.8 | 70.7 | 71.6 | 64.3 | 75.6 |
| FR-245 (wt %) (bromine wt %, calculated) | 23.9 (16) | 32.8 (22) | 23.9 (16.0) | | | |
| F-3020 (bromine wt %, calculated) | | | | 28.0 (16) | | |
| AMMP (wt %) | | | | 5 | | |
| Al (H$_2$PO$_2$)$_3$ (wt %) | | | | | 35 | |
| Ca (H$_2$PO$_2$)$_2$ (wt %) | | | | | | 24.0 |
| PTFE (wt %) | 0.2 | 0.2 | 0.2 | 0.2 | 0.3 | 0.2 |
| Irganox B-225 (wt %) | 0.2 | 0.2 | 0.2 | 0.2 | — | 0.2 |
| Flammability test | | | | | | |
| UL 94 V 1.6 mm | NR | V-0 | V-0 | NR | NR | NR |

The results indicate that an amount of 16 wt % bromine in the composition, supplied by either FR-245 or F-3020, is insufficient when antimony trioxide is absent, seeing that UL-94 rating is achieved neither in Examples 1 nor 4. To achieve UL-94 V-0/1.6 mm rating when FR-245 is used solely in ABS, it is necessary to increase the amount of bromine to about 22 wt %, namely, unacceptably high loading level of the flame retardant (~33%; Example 2). A fairly good replacement for antimony trioxide is the aluminum salt of methyl methylphosphonic acid (abbreviated AMMP), but 16% by weight of bromine are needed with a total loading level of the flame-retarding system being around 29% of the composition (Example 3).

As to the metal hypophosphite salts, they are clearly inefficient when used alone (Examples 5 and 6). Even at loading levels as high as 25-35% by weight, metal hypophosphite-containing ABS is unable to attain UL-94 rating.

Examples 7-12

ABS Flame Retarded with Bromine-Containing Compound and Metal Hypophosphite

As shown in this set of examples, a variety of bromine-containing flame retardants available in the market can be combined with aluminum or calcium hypophosphite to achieve antimony-free ABS compositions that are UL 94 V-1/1.6 mm or UL 94 V-0/1.6 mm rated. The amount of brominated flame retardant incorporated into the composition was adjusted to supply 12% by weight bromine concentration in the composition—a customary bromine concentration in many commercial ABS formulations.

TABLE 4

| | Example 7 | Example 8 | Example 9 | Example 10 | Example 11 | Example 12 |
| --- | --- | --- | --- | --- | --- | --- |
| composition | | | | | | |
| ABS (wt %) | 75.7 | 72.2 | 73.1 | 76.5 | 75.7 | 72.2 |
| FR-245 (wt %) (bromine wt %, cal.) | 17.9 (12) | | | | 17.9 (12) | |
| F-3020 (bromine wt %, cal.) | | 21.4 (12) | | | | 21.4 (12) |
| FR-1524 (bromine wt %, cal.) | | | 20.5 (12) | | | |
| FR-370 (bromine wt %, cal.) | | | | 17.1 (12) | | |
| Al (H$_2$PO$_2$)$_3$ (wt %) | 6.0 | 6.0 | 6.0 | 6.0 | | |
| Ca (H$_2$PO$_2$)$_2$ (wt %) | | | | | 6.0 | 6.0 |
| PTFE (wt %) | 0.2 | 0.2 | 0.2 | 0.2 | 0.2 | 0.2 |
| Irganox B-225 (wt %) | 0.2 | 0.2 | 0.2 | 0.2 | 0.2 | 0.2 |
| Flammability test | | | | | | |
| UL 94 1.6 mm | V-0 | V-0 | V-0 | V-0 | V-0 | V-1 |

The results tabulated in Table 4 indicate that metal hypophosphite functions as an effective replacement for antimony trioxide in ABS.

Examples 13-18

ABS Flame Retarded with Bromine-Containing Compound and Metal Hypophosphite

As shown in this set of examples, antimony-free ABS flame retarded with a bromine-containing compound {Tris (2,4,6-tribromophenoxy)-s-triazine, FR-245)] in the presence of metal hypophosphite can benefit from the incorporation of other additives into the composition. A phosphorus-containing flame retardant, charring agents and talc were tested as auxiliary additives.

The compositions and the results are tabulated in Table 5.

TABLE 5

| | Example 13 | Example 14 | Example 15 | Example 16 | Example 17 | Example 18 |
|---|---|---|---|---|---|---|
| Composition | | | | | | |
| ABS (wt %) | 70.7 | 70.7 | 74.7 | 77.2 | 75.7 | 75.7 |
| FR-245 (wt %) | 17.9 | 17.9 | 17.9 | 14.9 | 17.9 | 17.9 |
| (bromine wt %, cal.) | (12) | (12) | (12) | (10) | (12) | (12) |
| Al $(H_2PO_2)_3$ (wt %) | 3.0 | 3.0 | 4.0 | 6.0 | 4.5 | |
| Ca $(H_2PO_2)_2$ (wt %) | | | | | | 4.5 |
| HDP ® (wt %) | 3.0 | 3.0 | 2.0 | | | |
| Cresol Novolac (wt %) | | 5.0 | 1.0 | | | |
| PDMS (wt %) | 5.0 | | | | | |
| Talc MB (Talc wt %, calculated) | | | | 1.5 (0.9) | 1.5 (0.9) | 1.5 (0.9) |
| PTFE (wt %) | 0.2 | 0.2 | 0.2 | 0.2 | 0.2 | 0.2 |
| Irganox 1010 (wt %) | 0.2 | 0.2 | 0.2 | 0.2 | 0.2 | 0.2 |
| Flammability test | | | | | | |
| UL 94 1.6 mm | V-0 | V-1 | V-1 | V-1 | V-1 | V-0 |
| Mechanical properties | | | | | | |
| Izod notched impact (J/m) | 83 | ND | ND | ND | ND | 108 |
| Tensile strength (MPa) | 39.3 | ND | ND | ND | ND | 45.8 |
| Tensile modulus (MPa) | 2159 | ND | ND | ND | ND | 2619 |
| Elongation at break (%) | 3.3 | ND | ND | ND | ND | 5.2 |

The effect of added talc is particularly notable, seeing that the addition of talc supplied in a masterbatch form leads to improved mechanical properties of the ABS while keeping the total amount of flame retardant enhancers aiding FR-245 within the acceptable loading level of ~6-7% by weight. It is also observed that antimony-free, UL 94 V-1/1.6 mm rated ABS composition is reached with bromine concentration of only 10% by weight and a total loading level of flame retardant system (consisting of FR-245+metal hypophosphite+talc masterbatch) of less than 23% by weight.

Examples 19 (Comparative)

Antimony-free ABS formulation was prepared and tested according to the procedures set forth above. The composition and the results are set out in Table 6.

TABLE 6

| | Example 19 |
|---|---|
| composition | |
| ABS (wt %) | 75.7 |
| FR-245 (wt %) | 17.9 |
| (bromine wt %, calculated) | (12) |
| MPP | 6.0 |
| PTFE (wt %) | 0.2 |
| Irganox B-225 (wt %) | 0.2 |
| Flammability test | |
| UL 94 1.6 mm | NR |

Example 19 indicates that adding phosphorous-based flame retardant such as melamine polyphosphate (MPP) to ABS which is flame retarded with FR-245 does not compensate effectively for the absence of $Sb_2O_3$, seeing that the resultant formulation fails to achieve UL 94 1.6 mm rating with MPP loading level of 6.0 wt %.

Examples 20-25

ABS Flame Retarded with Bromine-Containing Compound, Calcium Hypophosphite and Polydimethylsiloxane The amount of brominated flame retardant added to the ABS compositions was adjusted such that the bromine concentration in the compositions varied over the range of ~10% to 14 wt %. As pointed out above, this is a customary bromine concentration range in many commercial ABS formulations. Imparting good flame retardancy to such formulations without the benefit gained by added antimony synergist is a challenging goal.

Thus, 10-14 wt % bromine-containing, antimony-free, ABS compositions were prepared in which calcium hypophosphite was tested as antimony replacement, aided by polydimethylsiloxane. The results are tabulated in Table 7.

TABLE 7

| | Example 20 | Example 21 | Example 22* | Example 23* | Example 24 | Example 25 |
|---|---|---|---|---|---|---|
| Composition | | | | | | |
| ABS (wt %) | 77.4 | 78.9 | 75.7 | 76.7 | 73.7 | 73.7 |
| FR-245 (wt %) | 15.7 | 15.7 | 17.9 | 17.9 | 20.9 | 20.9 |
| (bromine wt %, cal.) | (10.5) | (10.5) | (12.0) | (12.0) | (14.0) | (14.0) |
| Ca $(H_2PO_2)_2$ (wt %) | 5.0 | 3.5 | 3.0 | 2.5 | 3.5 | 2.0 |
| LYSI-300C (wt %) (60% PDMS on 40% silica) | 1.5 | 1.5 | 3.0 | 2.5 | 1.5 | 3.0 |
| PTFE (wt %) | 0.2 | 0.2 | 0.2 | 0.2 | 0.2 | 0.2 |
| Irganox 1010 (wt %) | 0.2 | 0.2 | 0.2 | 0.2 | 0.2 | 0.2 |
| Flammability test | | | | | | |
| UL 94 1.6 mm | V-0 | V-0 | V-0 | V-1 | V-0 | V-0 |
| Mechanical properties | | | | | | |
| Izod notched impact (J/m) | 102 | 115.3 | 119.2 | 127.4 | 104.2 | 111.2 |

*conditioned at 65° C. and 90% RH (relative humidity) for one week.

The results show that UL 94/1.6 mm V-0 (or V-1) rating is attainable over the range of ~10 to ~14 wt % bromine-containing ABS compositions in the absence of antimony, owing to addition of a fairly low amount of calcium hypophosphite and polydimethylsiloxane, producing ABS compositions displaying reduced flammability combined with satisfactory impact strength. It should be noted that an ABS composition related to Examples 22 ($Br_{Fr\ 245}$=12 wt %, calcium hypophosphite 6 wt %) displays izod notched impact of 102 J/m; hence it is seen that replacing part of the calcium hypophosphite with polydimethylsiloxane retains the reduced flammability and improves the mechanical properties; a similar trend is observed in Examples 24 and 25.

Examples 26-27

HIPS Flame-Retarded with a Combination Consisting of Bromine-Containing Compound and Metal Hypophosphite This set of examples show that HIPS can also be flame retarded effectively with bromine-containing compound {Tris(2,4,6-tribromophenoxy)-s-triazine, FR-245)] in the absence of antimony trioxide but with added metal hypophosphite.

TABLE 8

| | Example 26 | Example 27 |
|---|---|---|
| composition | | |
| HIPS (wt %) | 75.7 | 75.7 |
| FR-245 (wt %) | 17.9 | 17.9 |
| (bromine wt %, calculated) | (12) | (12) |
| $Al(H_2PO_2)_3$ (wt %) | 6.0 | |
| $Ca(H_2PO_2)_2$ (wt %) | | 6.0 |
| PTFE (wt %) | 0.2 | 0.2 |
| Irganox B-225 (wt %) | 0.2 | 0.2 |
| Flammability test | | |
| UL 94 1.6 mm | V-0 | V-1 |

The invention claimed is:

1. A composition comprising:
   an impact modified styrene-containing polymer; wherein the impact modified styrene-containing polymer is selected from the group consisting of acrylonitrile-butadiene-styrene (ABS) and high impact polystyrene (HIPS);
   at least one bromine-containing flame retardant;
   at least one metal hypophosphite salt $Mq+(H_2PO_2)_q$, wherein M indicates a metal cation with valence q; and
   at least one anti-dripping agent,
   wherein the total concentration of the bromine-containing flame retardant and the metal hypophosphite is less than 28% by weight based on the sum of all components in the composition, wherein the bromine concentration of the composition is from 9.5 to 15.5% by weight based on the total weight of the composition, wherein the composition is antimony-free and meets UL-94 V-1/1.6 mm or UL-94 V-0/1.6 mm test requirements.

2. A composition according to claim 1, wherein the total concentration of the bromine-containing flame retardant and the metal hypophosphite is from 18 to 26% by weight.

3. A composition according to claim 1, wherein the concentration of the metal hypophosphite is from 2 to 9% by weight based on the total weight of the composition.

4. A composition according to claim 1, wherein the bromine-containing flame retardant has bromine content of 50% to 70% by weight and its bromine atoms are either all aromatically-bound or all aliphatically-bound and the metal hypophosphite is aluminum hypophosphite, calcium hypophosphite or a mixture thereof.

5. A composition according to claim 4, wherein the bromine-containing flame retardant is selected from the group consisting of:

(i) Tris(2,4,6-tribromophenoxy)-s-triazine represented by the following formula:

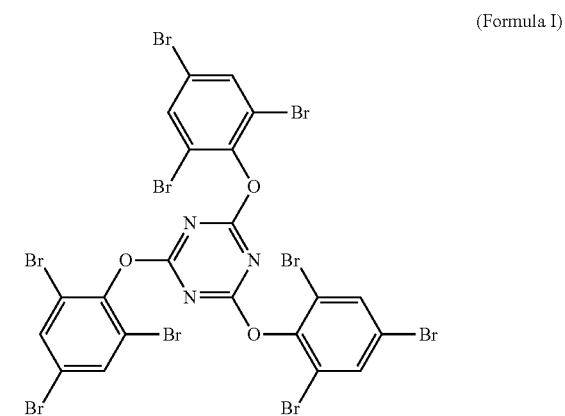 [SMILES: Brc1cc(Br)c(Oc2nc(Oc3c(Br)cc(Br)cc3Br)nc(Oc3c(Br)cc(Br)cc3Br)n2)c(Br)c1]

(Formula I)

(ii) Tris(tribromoneopentyl) phosphate represented by the following formula:

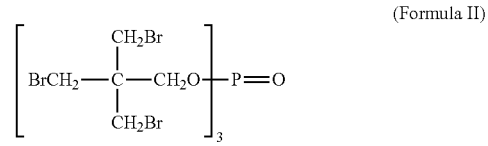

(Formula II)

iii) Tetrabromobisphenol A represented by the following formula:

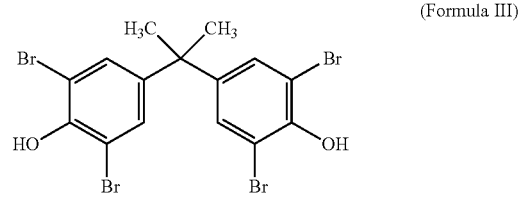 [SMILES: CC(C)(c1cc(Br)c(O)c(Br)c1)c1cc(Br)c(O)c(Br)c1]

(Formula III)

iv) brominated epoxy resins and end-capped derivatives thereof, represented by the formula:

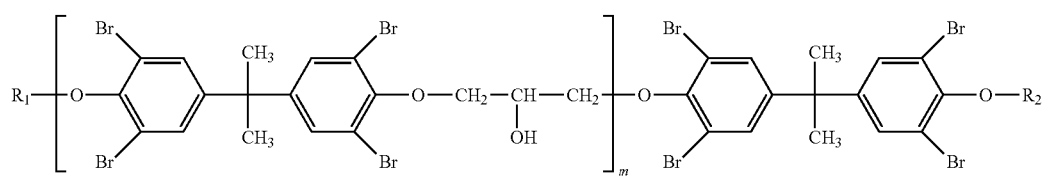

wherein m indicates degree of polymerization, $R_1$ and $R_2$ are independently selected from the group consisting of:

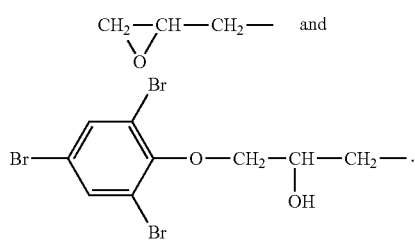

6. A composition according to claim 5, wherein the bromine-containing flame retardant is tris(2,4,6-tribromophenoxy)-s-triazine.

7. A composition according to claim 6, comprising from 60 to 80% by weight of ABS or HIPS, from 15 to 20% by weight of tris(2,4,6-tribromophenoxy)-s-triazine, from 3 to 9% by weight of $Al(H_2PO_2)3$, $Ca(H_2PO_2)2$ or a mixture thereof and from 0.1 to 0.5% by weight of polytetrafluoroethylene, based on the total weight of the composition.

8. A composition according to claim 5, wherein the bromine-containing flame retardant is tris(tribromoneopentyl) phosphate.

9. A composition according to claim 8, comprising from 60 to 80% by weight of ABS, from 15 to 20% by weight of tris(tribromoneopentyl) phosphate, from 3 to 9% by weight of $Al(H_2PO_2)3$, $Ca(H_2PO_2)2$ or a mixture thereof and from 0.1 to 0.5% by weight of polytetrafluoroethylene based on the total weight of the composition.

10. A composition according to claim 5, wherein the bromine-containing flame retardant is tetrabromobisphenol A.

11. A composition according to claim 10, comprising from 60 to 80% by weight of ABS, from 18 to 23% by weight of tetrabromobisphenol A, from 3 to 9% by weight of $Al(H_2PO_2)3$, $Ca(H_2PO_2)2$ or a mixture thereof and from 0.1 to 0.5% by weight of polytetrafluoroethylene based on the total weight of the composition.

12. A composition according to claim 5, wherein the bromine-containing flame retardant is tribromophenol end-capped low-molecular weight resin represented by the following Formula (IVa) and mixtures thereof:

wherein m is an integer in the range between 0 and 5 with number-average molecular weight from 1300 to 2500.

13. A composition according to claim 12, comprising from 60 to 80% by weight of ABS, from 18 to 23% by weight of tribromophenol end-capped low-molecular weight epoxy resin of Formula IVa, from 3 to 9% by weight of $Al(H_2PO_2)3$, $Ca(H_2PO_2)2$ or a mixture thereof and from 0.1 to 0.5% by weight of polytetrafluoroethylene based on the total weight of the composition.

14. A composition according to claim 13, wherein the composition further comprises an additive selected from the group consisting of aryl phosphate ester of hydroquinone, polydimethylsiloxane and novolac epoxy resins.

15. A composition according to claim 14, wherein the bromine concentration of the composition is from 10 to 15% by weight and the bromine/metal hypophosphite(s) weight ratio is greater than 2:1.

16. A composition according to claim 15, wherein the bromine/metal hypophosphite(s) weight ratio is from 3:1 to 7:1.

17. A composition according to claim 14, comprising from 60 to 80% by weight of ABS, from 15 to 20% by weight of tris(2,4,6-tribromophenoxy)-s-triazine, from 3 to 6% by weight of Al $(H_2PO_2)_3$, $Ca(H_2PO_2)_2$ or a mixture thereof, from 1 to 10% by weight of a combination consisting of aryl phosphate ester of hydroquinone and at least one of polydimethylsiloxane and novolac epoxy resins, and from 0.1 to 0.5% by weight of polytetrafluoroethylene based on the total weight of the composition.

18. A composition according to claim 14, comprising ABS, 10 to 15% by weight bromine supplied by the bromine-containing flame retardant, Ca(H2P02)2 and polydimethylsiloxane wherein the weight ratio bromine:$Ca(H_2PO_2)2$ is greater than 2:1 and the weight ratio $Ca(H_2PO_2)2$: polydimethylsiloxane is from 7:1 to 1:2.

19. A composition according to claim 18, wherein the total concentration of the $Ca(H_2PO_2)2$ +polydimethylsiloxane mixture is from 4 to 7% by weight based on the total weight of the composition.

20. A composition according to claim 19, comprising from 70 to 80% ABS, from 15 to 22.5% by weight of tris(2,4,6-tribromophenoxy)-s-triazine, from 2.0 to 5.0% by weight of $Ca(H_2PO_2)2$, from 0.5 to 4.0% polydimethylsiloxane and from 0.1 to 0.5% by weight of polytetrafluoroethylene based on the total weight of the composition.

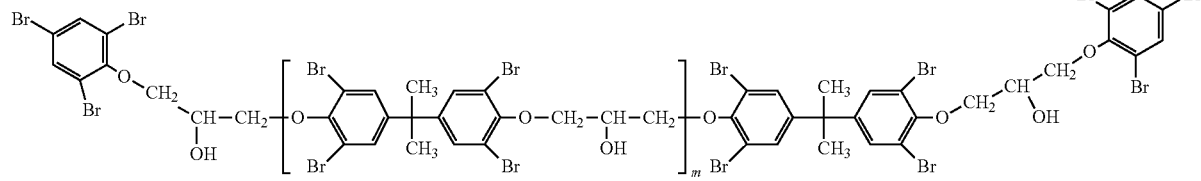

21. A composition according to claim 13, further comprising from 0.5 to 3% by weight of talc based on the total weight of the composition.

22. A composition according to claim 21, comprising from 60 to 80% by weight of ABS, from 13 to 18% by weight of tris(2,4,6-tribromophenoxy)-s-triazine, from 4 to 8% by weight of $Al(H_2PO_2)_3$, $Ca(H_2PO_2)_2$ or a mixture thereof, from 0.5 to 3% by weight of talc and from 0.1 to 0.5% by weight of polytetrafluoroethylene based on the total weight of the composition.

23. A molded article comprising the composition of claim 1.

* * * * *